No. 643,525. Patented Feb. 13, 1900.
A. OLSON.
MOTOR FOR VEHICLES.
(Application filed June 3, 1899.)
(No Model.)
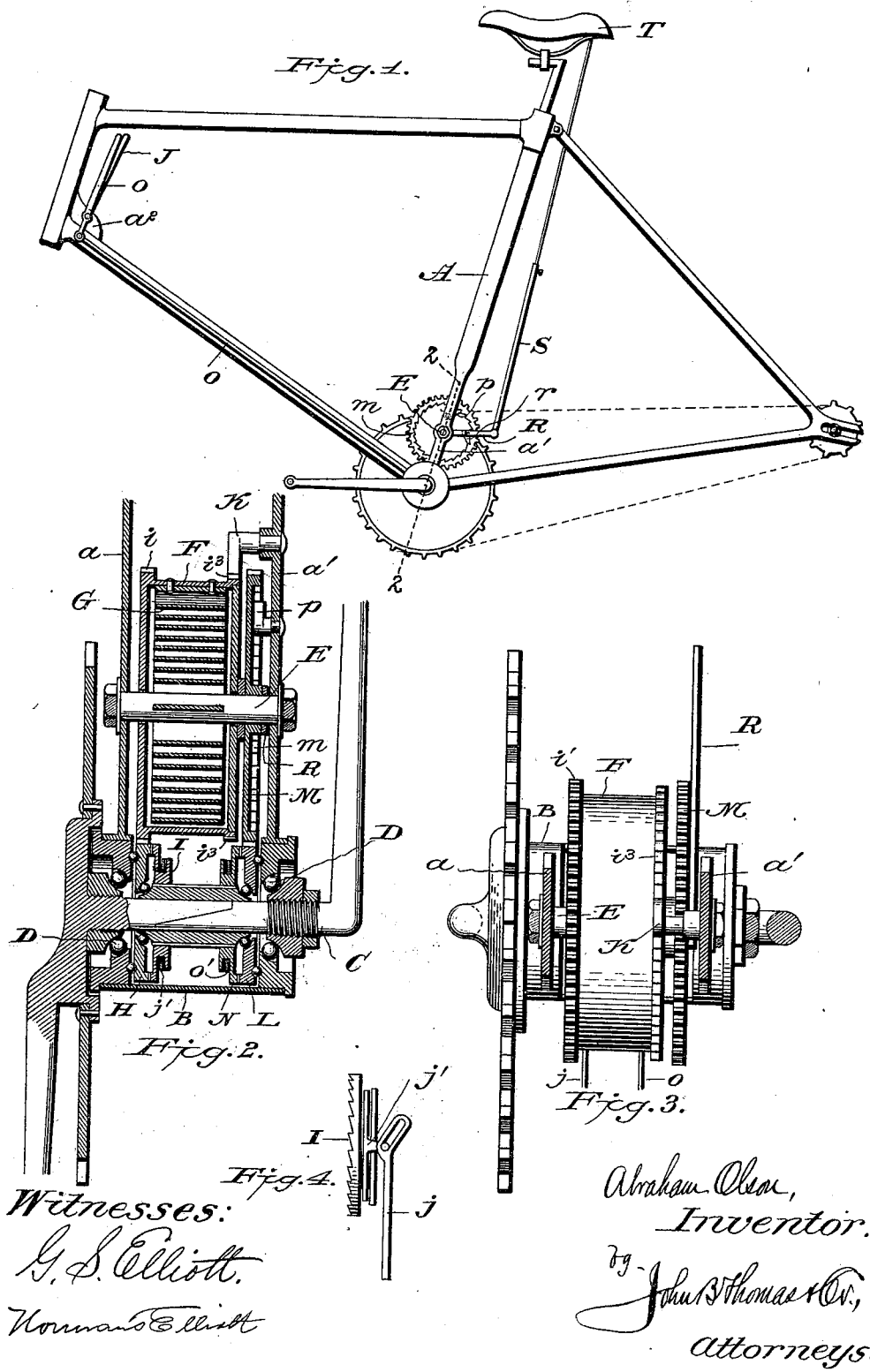
Witnesses:
G. S. Elliott.
Norman S. Elliott.
Abraham Olson,
Inventor:
by John B. Thomas & Co.,
Attorneys.

UNITED STATES PATENT OFFICE.

ABRAHAM OLSON, OF MINNEAPOLIS, MINNESOTA.

MOTOR FOR VEHICLES.

SPECIFICATION forming part of Letters Patent No. 643,525, dated February 13, 1900.

Application filed June 3, 1899. Serial No. 719,266. (No model.)

*To all whom it may concern:*

Be it known that I, ABRAHAM OLSON, a citizen of the United States, and a resident of Minneapolis, in the county of Hennepin and State of Minnesota, have invented certain new and useful Improvements in Motors for Vehicles, of which the following is a specification.

The primary object of this invention is to provide an auxiliary spring-motor for bicycles and velocipedes which can be readily thrown into gear with the ordinary driving mechanism and will assist the rider in propelling the vehicle, more especially in climbing a hill, certain devices being also provided whereby the motor can be rewound by utilizing either the gravity of the vehicle and rider in descending a hill or the vibrations of the saddle caused by the shifting weight of the rider when the vehicle is passing over an uneven surface. The invention therefore contemplates the production of a reserve motor which can be employed to relieve the rider of any considerable strain incident to the propulsion of the vehicle up a hill or steep grade and utilize the laws of gravity in rewinding the spring of the motor. In other words, the running of the vehicle down a hill or over an uneven surface will be made to accumulate and store a certain amount of power that can be used by the rider when desired by throwing the motor into gear with the propelling mechanism, the rewinding of the motor on a downgrade also serving to retard the speed of the vehicle and forming a practical brake in addition to storing power for future use.

With the above objects in view the invention therefore consists in providing a motor that shall be simple, compact, and conveniently located, comprising a casing, a strong spring inclosed therein and connected to a shaft, gear-wheels connected to the shaft and casing, and gear-wheels on the crank-axle of the propelling mechanism adapted to be thrown into mesh with the former gear-wheels for the purpose of utilizing the power of the spring and for rewinding said spring, together with levers and connections for shifting the movable gear-wheels, and a supplemental rewinding device operated from the saddle of the vehicle.

The following specification enters into a detail description of my invention, reference being had to the accompanying drawings, and to the letters thereon, which designate the different parts, and what I claim as new, and desire to protect by Letters Patent, is particularly set forth in the appended claim.

In the drawings forming a part hereof, Figure 1 is a side elevation showing the application of my improved motor to a bicycle. Fig. 2 is a sectional view, enlarged, on the line 2 2 of Fig. 1. Fig. 3 is a plan view of the motor. Fig. 4 is a detail view of one of the clutches and devices for shifting the same in and out of engagement with the gear-wheel on the axle of the bicycle.

In applying my invention to a bicycle the seat-post tube A of the frame of the bicycle is provided at its lower portion with branch members $a$ and $a'$, to which the bearing-brackets B for the crank-axle of the propelling mechanism are attached, the said crank-axle (designated by the letter C) being geared to the driving-wheel by sprocket wheel and chain, though any style of gearing may be employed. The bearing-bracket B carries the ordinary ball-bearings D D for the crank-axle and also incloses certain gearing mechanism, hereinafter described, which serves to connect the crank-axle to the motor.

Journaled in the branch members $a$ $a'$ of the seat-post tube of the bicycle is a transverse shaft E, upon which is mounted a circular casing F, inclosing a strong spiral spring G, the inner end of which is secured to the shaft, while the outer end is secured to the rim of the casing, the latter being rotatable on the shaft, so that the said spring can be wound by turning the shaft and in unwinding will rotate the casing by which the power of the spring is transmitted. The spring is made of flat steel and exceedingly strong, so that the rotary motion imparted to the casing by the unwinding of said spring may be utilized with good effect in operating the propelling mechanism of the bicycle, and to this end the casing is geared directly to the crank-axle C through the intervention of a small gear-wheel H on said axle meshing with a peripheral series of gear-teeth $i$ on one head of the casing; but as the power of the spring through the medium of the casing is only transmitted to the crank-axle of the propelling mechanism when the operator desires the assistance of the motor the said gear-wheel H is loosely mounted upon the crank-axle and is thrown in and out of connection therewith by a sliding clutch member I, having a clutch-face adapted to engage a corresponding face on the gear-wheel. The clutch member or sliding section I has a groove which receives a spline or feather on the crank-axle, by which said section is rotatably connected to the axle at all times, being moved or shifted by means of a lever J, pivoted to a bracket $a^2$ at the front of the bicycle-frame and connected to said sliding clutch-section through the intervention of the rod $j$ and yoke $j'$, the latter engaging a peripheral groove in the clutch-section. The casing is held against the action of the spring by means of a dog K, pivoted to the member $a'$ of the seat-post tube, engaging the ratchet-teeth $i^3$ of the casing, and when this dog is in engagement with the casing the gear-wheel H can be disconnected from the crank-axle, as hereinbefore described, and said crank-axle propelled by the rider in the usual manner, the gear-wheel being provided with ball-bearings, as shown, to reduce friction.

Now in order to provide for winding the spring by the momentum of the bicycle in descending a hill the rotations of the crank-axle through its gearing with the drive-wheel are imparted to the shaft E, to which said spring is connected. This is effected by means of a small gear-wheel L on the crank-axle in mesh with a large gear-wheel M on the shaft at one side of the casing, the small gear-wheel being connected to rotate with the crank-axle by means of a sliding clutch-section N, similar to the clutch-section I, and shifted by a lever O, alongside of the lever J, said lever O being connected to its clutch-section by rod $o$ and yoke $o'$. Backward rotation of shaft E is prevented by a pawl $p$ engaging ratchet-teeth $m$ on the inner side of the projecting rim of large gear-wheel M. Provision is also made for winding the spring from the vibrations imparted to the bicycle-saddle by the rider when the bicycle is passing over an uneven surface, and to this end a lever R is pivoted at its inner end on the shaft E and at an intermediate portion carries a pawl $r$, engaging the ratchet-teeth $m$, hereinbefore referred to, said lever being operated by a vertical rod S, connected to the outer end thereof and to the rear end of the saddle T. The rod S is extensible, consisting of two sections, as shown, so that said rod can be adjusted to suit the adjustments that may be given to the saddle to accommodate the reach of the rider. It will be noted that by this arrangement the vertical reciprocations of the rod caused by the vibrations of the saddle may be utilized in winding the spring, so that the operation of rewinding may not depend solely upon the bicycle descending a hill.

From the foregoing description, in connection with the accompanying drawings, the construction, operation, and practical advantages of my improved spring-motor for vehicles will be readily understood, for in use in connection with a bicycle it is possible for the rider to utilize the momentum in descending a hill to rewind the motor by shifting gear-wheel L on crank-axle in mesh with gear-wheel M on spring-shaft, so that the revolutions imparted to said crank-axle by the driving-wheel or ground-wheel will turn the shaft and wind the spring thereon, the dog K being in engagement with the teeth $i^3$ on the casing to prevent rotation thereof. The power of the wound spring can then be reserved until the rider needs its assistance—for instance, in climbing a hill—and then the gear-wheel L having been disconnected from the crank-axle the gear-wheel H is connected thereto, and the dog K being released the casing will be rotated by the spring and transmit power to the crank-axle of the propelling mechanism.

If desired, a rod may be connected to the dog K and led to a convenient point for operation by the rider.

It will be noted that when gear-wheel L is connected to the crank-axle to turn the shaft and rewind the spring when the vehicle is running downhill the force required to wind the spring will of course retard the progress of the vehicle, and consequently act as a practical brake.

I have shown and described my improved spring-motor as applied to a bicycle; but it is apparent that it could be effectively applied to any other wheeled vehicle for the purpose of accumulating and storing power for future use, and I contemplate extending its application to carriages and buggies, the construction and arrangement of parts being changed to suit the different conditions. It is obvious also that instead of employing clutch mechanism for gearing the parts of the motor to the axle the gear-wheels themselves could be shifted on the axle; but the arrangement shown and described is preferred. Other modifications or changes could be made without sacrificing any of the advantages of the motor of the character described, and I desire, therefore, to be protected in the invention within the spirit and scope of my claim.

Having thus described my invention, what I claim as new, and desire to secure by Letters Patent, is—

In a spring-motor for vehicles, the combination with the driving-axle, of a shaft mounted in suitable bearings parallel with said axle, a casing rotatably mounted on the shaft, a spring connected to shaft and casing, gear-wheels on the shaft and casing, respectively, gear-wheels on the axle adapted to mesh with the gear-wheels on the shaft and casing and provided with clutch-faces, clutch-sections slidably mounted on the axle and adapted to engage the gear-wheels on the axle, and means for operating said clutch-sections; together with a lever and pawl, the latter engaging ratchet-wheel on the shaft, a rod connecting the lever to the seat of the vehicle, a dog engaging a ratchet-wheel of the casing, and a pawl engaging the ratchet-wheel on the shaft, substantially as shown and for the purpose set forth.

In testimony whereof I hereunto affix my signature in the presence of two witnesses.

ABRAHAM OLSON.

Witnesses:
C. A. OKISON,
ISAAC PETERSON.